United States Patent [19]

Satoh et al.

[11] Patent Number: 4,769,115
[45] Date of Patent: Sep. 6, 1988

[54] PROCESS FOR PREPARING ELECTRICALLY CONDUCTIVE POLYMER

[75] Inventors: Masaharu Satoh, Toyonaka; Keiichi Kaneto, Suita; Katsumi Yoshino, 166-3, Obucho, Kishiwada-shi, Osaka, all of Japan

[73] Assignees: Kao Corporation, Tokyo; Katsumi Yoshino, Osaka, both of Japan

[21] Appl. No.: 890,473

[22] Filed: Jul. 30, 1986

[30] Foreign Application Priority Data

Aug. 12, 1985 [JP] Japan .............................. 60-177259
Oct. 16, 1985 [JP] Japan .............................. 60-230823
Oct. 16, 1985 [JP] Japan .............................. 60-230824
Oct. 16, 1985 [JP] Japan .............................. 60-230825

[51] Int. Cl.$^4$ .................... C25C 11/00; H01B 1/06
[52] U.S. Cl. ................................ 204/59 R; 204/72; 204/78; 204/291; 252/500; 252/512; 252/513; 252/514; 252/518
[58] Field of Search ............... 252/500, 512, 513, 514, 252/518; 204/59 R, 72, 78, 291

[56] References Cited

U.S. PATENT DOCUMENTS

| | | | |
|---|---|---|---|
| 4,546,010 | 10/1985 | Keller et al. | 252/518 |
| 4,566,955 | 1/1986 | Naarmann | 204/59 R |
| 4,582,587 | 4/1986 | Hotta et al. | 204/59 R |
| 4,585,581 | 4/1986 | Skotheun | 252/518 |
| 4,604,427 | 8/1986 | Roberts et al. | 252/500 |
| 4,617,143 | 10/1986 | Kossmehl et al. | 252/518 |
| 4,622,169 | 11/1986 | Rickle | 252/518 |

FOREIGN PATENT DOCUMENTS

0016305 1/1980 European Pat. Off. .

OTHER PUBLICATIONS

Polymerization of Benzene by Peter Kovacic et al., pp. 454-458 (1962).
Electrochemical Doping of Poly(p—phenylene) by L. W. Shacklette et al.-pp. 361-362 (1982).
Electrochemical Preparation of High Quality Poly by M. Satoh et al.-pp. 1629-1630 (1985).
Electrochemical Polymerization of Benzene by Kyozi Kaeriyama-pp. 1199-1200 (1984).
Electrochemical Polymerization of Napthalene by M. Satoh et al.-pp. 550-551 (1986).
Electrochemical Polymerization of Anthracene by M. Satoh et al.-pp. 979-980 (1986).

*Primary Examiner*—Josephine Barr
*Attorney, Agent, or Firm*—Birch, Stewart, Kolasch & Birch

[57] ABSTRACT

An electrically conductive polymer is produced by dissolving or dispersing a monomer of an aromatic compound or a derivative thereof and an electrolyte in an organic polar medium, effecting an electrochemical, anodic oxidation in the resulting solution or dispersion, in the presence of one or more metal ions, to obtain an electrically conductive polymer, and separating the obtained polymer. The metal ion is being selected from the group consisting of a copper ion, bivalent silver ion, trivalent iron ion, trivalent manganese ion, a ruthenium ion, a rhenium ion and a rhodium ion. Films of the polymer have high conductivity.

14 Claims, 1 Drawing Sheet

PROCESS FOR PREPARING ELECTRICALLY CONDUCTIVE POLYMER

The present invention relates to a process for preparing an electrically conductive, or electroconductive, polymer. More specifically, the present invention relates to a process for producing the polymer by an electrochemical oxidation method in which an aromatic compound is used as a monomer for polymerization.

BACKGROUND OF THE INVENTION

It has been known that $\pi$-electron conjugated type polymeric compounds are transformed from semiconductors into conductors by partial oxidation or reduction and can be provided with an extremely high electroconductivity as that of organic compounds. Various kinds of $\pi$-electron conjugated type polymeric compounds such as polyacetylene, polythiophene, polypyrrole, and polyhenylene have previously been developed and their applications have now been studied while utilizing their properties as a semiconductor and a conductor, and the properties of changing the electroconductivity by the dopant. Further, with recent progress in science and technology, demands have increased more and more for electronics display devices, batteries of high efficiency, and various kinds of sensors, and electroconductive polymers are expected to be capable of playing an important role in these fields.

Presently, many have sought to develop safe and convenient methods capable of providing electroconductive high polymers having higher electroconductivity, mechanical strength, and excellent circumstantial stability in any desired form, and preferably in the form of films which are advantageous for practical use.

It has been known that the $\pi$-electron conjugated type polymeric compounds have excellent heat resistance due to their rigid molecular structures, and they are also expected to be substituents for metal materials such as for use in space aircraft, engineering plastics, and the like.

The recent progress in these technical fields can include the following.

For instance, Japanese Patent Laid-Open No. 89640/1983 discloses an electroconductive polyacetylene high polymer and Japanese Patent Laid-Open No. 47421/1981 discloses a linear poly(2,5-thienylene) polymer, a process for production thereof, and a semiconductor made of the produced polymer. Further, "J. Polym. Sci." by Kovacic, et al, vol. 18, (1980), page 2423+, or vol. 19, page 347+ disclose synthetic examples of polyparaphenylene, polyfuran and polyselenophene. Heretofore, the $\pi$-electron conjugated type polymeric compounds as described above have been synthesized by using an oxidant such as sodium dichromate or a catalyst such as cuprous chloride and a nickel compound, or often prepared by pelletizing monomers and then applying a heat treatment at a high temperature.

As one of the methods of synthesizing the $\pi$-electron conjugated type polymeric compounds other than those described above, there can be mentioned an electrochemical anodizing process. For instance, U.S. Pat. No. 3,574,072 discloses an example for the polymerization of a 5- or 6-membered heterocyclic compound, particularly, pyrrole, by means of electrochemical anodization. Further, "J. Chem. Soc. Chem. Commun." written by A. F. Diaz, page 635+ published in 1979, discloses that a film having an electroconductivity of less than 100 S/cm is formed by the anodizing polymerization of pyrrole in the presence of an electrolyte. The feature of the electrochemical anodizing method resides in that the resultant electroconductive high polymer can be obtained in the form of a film and that the amount of the dopant contained in the film can be controlled with ease and, accordingly, it is expected to be an effective method for obtaining an electroconductive polymeric film of relatively high electroconductivity.

However, examples of electroconductive high polymers obtained by the electrochemical anodizing process reported so far have been limited only to 5-membered heterocyclic polymers such as polypyrrole and polythiophene, as well as polyaniline, polypyridazine and polyphenylene.

Particularly, while polyphenylene has been noted from the early stages as an electroconductive high polymer, films having favorable properties have not yet been synthesized. For instance, "J. Polym. Sci., Polym. Chem. Ed." written by L. Rubinstein, vol. 21 (1983), page 3035+ discloses the synthesis of polyphenylene from a 2-phase solution of hydrofluoric acidbenzine by an electrochemical process and the properties thereof. Further, "J. Chem. Soc. Chem. Commun." written by K. Kaeriyame, 1984, page 1199+, discloses the synthesis of polyphenylene from a benzene solution containing aluminum chloride and various types of amine salts by an electrochemical process and the properties thereof. However, the electroconductivity of the polyphenylene films obtained by these methods is only within a range of $10^{-5}$–$10^{-4}$ S/cm, which is extremely low as compared with the values obtained by the pressure molding of powdery polyphenylene prepared by the conventional method, that is, a method of reacting benzene with an oxidizing agent shown in "J. Chem. Phys." written by D. M. Ivory, et al, vol. 71, (1979), page 1506+.

Furthermore, the $\pi$-electron conjugated type polymeric compounds as described above and obtained by the conventional production process have often involved problems because they are significantly poor in moldability/workability due to their diminished ability to melt or dissolve, although they are excellent in heat resistance. Particularly, although electroconductive polymeric compounds such as polyparaphenylene, using a benzene or benzene derivative such as diphenyl as the monomer, cannot be obtained in the film-like state by the conventional method, advantageous properties have been expected therefor, such as electrode material for use in batteries at high efficiency. Accordingly, practical use of these electroconductive high polymers has not yet progressed at present.

SUMMARY OF THE INVENTION

The present inventors have made various studies with the goal of overcoming the foregoing problems, that is, the incomplete electrical performance of the electroconductive high polymers obtained by the conventional production process and poor moldability as well as for overcoming the production problems. As a result, this invention has been accomplished based on the findings that an electroconductive high polymer having an extremely high electroconductivity can be obtained in a desired form by dissolving or dispersing an aromatic compound or the derivative thereof in an electrolyte solution containing a specific metal ion and then electrochemically anodizing the compound or the derivative thereof.

The present invention provides a process for producing an electrically conductive polymer, which comprises the steps of dissolving or dispersing a monomer of an aromatic compound or a derivative thereof and an electrolyte in an organic polar medium, effecting an electrochemical, anodic oxidation in the resulting solution or dispersion, in the presence of one or more metal ions, to obtain an electrically conductive polymer and separating the obtained polymer. The metal ion is selected from the group consisting of a copper ion, bivalent silver ion, trivalent iron ion, trivalent manganese ion, a ruthenium ion, a rhenium ion, and a rhodium ion.

The present invention is characterized by the addition of the metal ion to the reaction mixuture. It is preferable that the metal ion is contained in the reaction mixture is an amount of from 0.001 mole per liter to the saturation point. From the practical point of view, the metal ion may be in an amount of up to 0.1 mole per liter.

It is preferable that the monomer is contained in the reaction mixture in an amount of 0.1 to 10 moles per liter and that the electrolyte is contained in the reaction mixture in an amount of 0.001 mole per liter to the saturation point. From a practical point of view, the electrolyte may be used up to 0.1 mole per liter.

According to the process for producing the electroconductive high polymer of this invention, high polymers having high electroconductivity can be obtained as shown specifically in the Examples.

The process for producing the electroconductive high polymer according to this invention has a feature of containing a specific metal ion in the electrolyte medium, different from the electrochemical oxidizing processes reported so far. The electrochemical anodizing process has heretofore been carried out by dissolving a monomer and an electrolyte such as LiBF$_4$ in an organic solvent such as acetonitrile and applying a voltage between immersed electrodes. In this conventional method, no polymerization reaction was recognized if benzene or naphthalene is used as the monomer but only a 5-membered heterocyclic compound or the like can be used as the monomer. However, benzene or the like can also be used in this invention.

Since the electroconductive high polymer film and semiconductive high polymer film obtained by neutralizing the same according to this invention can be provided with further higher electroconductivity by the use of various kinds of dopants, it can be utilized, for example, for electrode active substance in electric cells, electronic display devices such as optical switches, solar cells and various kinds of sensors. Particularly, the process for producing the electroconductive high polymer according to this invention represents significant technical progress as a method of producing polyparaphenylene and the derivatives thereof which are noted as the electrode active substance for use in secondary cells capable of charging and discharging at a high efficiency with safety. Further, the electroconductive high polymer produced by the process according to the invention also functions as a semiconductor and thus can be used as the material for electronics semiconductor devices.

As has been described above, the present invention provides a process for producing a polymeric film of an aromatic compound having excellent properties that can be utilized in the field of electronic materials and the like.

DETAILED DESCRIPTION OF THE INVENTION

The invention will be illustrated below according to particular embodiments of the specific metal ions. The description of the copper ion, however, will apply to the processes on the other metal ions.

COPPER ION

The present invention provides a process for producing an electroconductive high polymer by dissolving or dispersing an aromatic compound or the derivative thereof into an electrolyte solution and then electrochemically anodizing the compound or the derivative thereof, wherein the electrolyte solution contains copper ions.

According to the process of this invention, a particularly excellent effect can be obtained when the electrolyte solution contains one or more of ions selected from $BF_4^-$, $ClO_4^-$, and $AsF_6^-$, and a smooth and uniform film-like high polymer having an electroconductivity of greater than 10 or 100 S/cm can be obtained.

In this invention, the solvents usually employed in the electrochemical anodizing reaction can be used as the medium and they include, for example, acetonitrile, benzonitrile, nitrobenzene, nitromethane, dimethylformamide, hexamethylphosphoamide, pyridine, propylene carbonate, tetrahydrofuran, dimethylsulfoxide, and dioxane. Nitrobenzene, acetonitrile and benzonitrile are preferred in view of the easiness of the resulting reaction.

The electrolyte for use in this invention can include, as anions, alkali metal salts and alkaline earth metal salts, ammonium salts and tetraalkyl ammonium salts of halogen elements such as iodine, bromine, chlorine and fluorine, and natural Lewis acid compounds such as $BF_4^-$, $ClO_4^-$, $AsF_6^-$, $SO_3^-$ and $PF_6^-$. Among all of these halogen compounds, particularly, halogenated metal salts such as $LiAsF_6$, $LiClO_4$ and $LiBF_4$, tetrabutyl ammonium (hereinafter simply referred to as TBA).$AsF_6$, $TBA.ClO_4$, $TBA.BF_4$ and other like halogenated tetraalkyl ammoniums are preferred electrolytes.

The monomers that can be polymerized by the process according to this invention can include substituted or non-substituted compounds such as benzene, biphenyl, diphenylbenzene, dibiphenylyl, naphthalene, anthrathene, or the derivatives thereof. A high polymer having a high electroconductivity can be obtained by practicing the process according to the present invention by using these monomers.

In the present invention, an electroconductive high polymer is produced by adding the monomer and the electrolyte in a polar solvent and applying a voltage while immersing an anode and a cathode. In this case, it is essential that the electrolyte solution contain copper ions.

In the case of using benzene as the monomer, it is preferred to use one of nitrobenzene, acetonitrile and the benzonitrile as the solvent, one or more of members selected from $LiBF_4$, $LiAsF_6$, $LiClO_4$ as the electrolyte, and cupric chloride as the copper compound for supplying copper ions in combination and, particularly, the combined use of nitrobenzene, $LiAsF_6$, cupric chloride is preferred.

While there are particular restrictions for the concentration of the monomer used, concentration greater than 0.1 mol/liter is preferred. Further, while there are no particular restrictions for the electrolyte and the copper ion concentrations, they can be used at an appropriate concentration higher than 0.001 mol/liter.

There are also no particular restrictions on the reaction temperature, but a temperature lower than 80° C. is desirable for avoiding the reaction between a solvent and the monomer. The reaction may be effected at room temperature in air or in an inert gas.

The shape of the electroconductive high polymer film obtained by the process according to this invention can be controlled by varying the shape of the electrodes used. Further, while the surface state of the product may be varied by the solvent or the electrolyte employed, it is mainly controlled by the application voltage. Although a voltage ranging from 5 to 80 V can be used in this invention, it is preferred to use a voltage within a range of 15 to 40 V.

For controlling the film thickness of the electroconductive high polymer deposited on the electrode, it is advantageous to measure the amount of current (ampere/sec).

There are no particular restrictions on the materials for the electrode usable herein and any of organic or inorganic electroconductive materials may be used. Usually, platinum or electroconductive glass coated with In-Sn oxide (hereinafter referred to as ITO) is used as the anode and nickel or a like other metal is used as the cathode.

The electroconductive high polymer produced by the process according to this invention, which contains electrolyte anions as the dopant and exhibits high electroconductivity, can easily be formed into a neutral semiconducting high polymer by splitting off anions as the dopant by immersing into an aqueous alkaline solution or shortcircuitting both electrodes in electrolyte solution in the same way as usual electroconductive high polymers produced by other processes. The dopant can of course be added again to the neutral semiconductive high polymer by an electrochemical or chemical process. The process for producing the electroconductive high polymer according to the present invention can provide a method of producing a film of high conductive and uniform electroconductive high polymer as described above, as well as provide a method of producing a film of semiconductive high polymer having a uniform and smooth film surface.

BIVALENT SILVER ION

In this invention, an electroconductive high polymer is produced by adding the monomer and the electrolyte in a polar solvent and applying a voltage while immersing an anode and a cathode. In this case, it is essential that the electrolyte solution contain bivalent silver ions.

The substance producing bivalent silver ions can include AgO, AgF$_2$, and complex salts with organic materials.

In the case of using benzene as the monomer, it is preferred to use one of nitrobenzene, acetonitrile, and benzonitrile as the solvent, one or more of members selected from LiBF$_4$, LiAsF$_6$, LiClO$_4$ as the electrolyte, and AgO as the silver compound for supplying bivalent silver ions and, particularly, the combined use of nitrobenzene, LiAsF$_6$, and AgO is preferred.

TRIVALENT ION OF IRON OR MANGANESE

In this invention, an electroconductive high polymer is produced by adding the monomer and the electrolyte in a polar solvent and applying a voltage while immersing an anode and a cathode. In this case, it is essential that the electrolyte solution contain bivalent iron or manganese ion.

The substance producing trivalent iron ions and/or trivalent manganese ions ions can include FeCl$_3$, Fe$_2$(SO$_4$)$_3$, Fe$_2$O$_3$, Mn$_2$O$_3$, etc.

When using benzene as the monomer, it is preferred to use one of nitrobenzene, acetonitrile, and benzonitrile as the solvent, one or more of members selected from LiBF$_4$, LiAsF$_6$, and LiClO$_4$ as the electrolyte, and FeCl$_3$ or MnCl$_3$ as the compound for supplying bivalent trivalent iron ions and/or trivalent manganese ions, and particularly, the combined use of nitrobenzene, LiAsF$_6$, and MnCl$_3$ is preferred.

ION OF RUTHERNIUM, RHENIUM OR RHODIUM

An electroconductive high polymer is produced by adding the monomer and the electrolyte in a polar solvent and applying a voltage while immersing an anode and a cathode. In this case, it is essential that the electrolyte solution contain ions selected from the group consisting of ruthenium, rhenium, and rhodium.

The substance producing those ions can include, for example, halides of these compounds, with chlorides being particularly preferred.

In the case of using benzene as the monomer, it is preferred to use one of nitrobenzene, acetonitrile, and benzonitrile as the solvent, one or more of members selected from LiBF$_4$, LiAsF$_6$, and LiClO$_4$ as the electrolyte, and FeCl$_3$ or MnCl$_3$ as the compound for supplying ruthenium, rhenium and rhodium ions and, particularly, the combined use of nitrobenzene, LiAsF$_6$, and MnCl$_3$ is preferred.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

EXAMPLE 1

Figure 1:
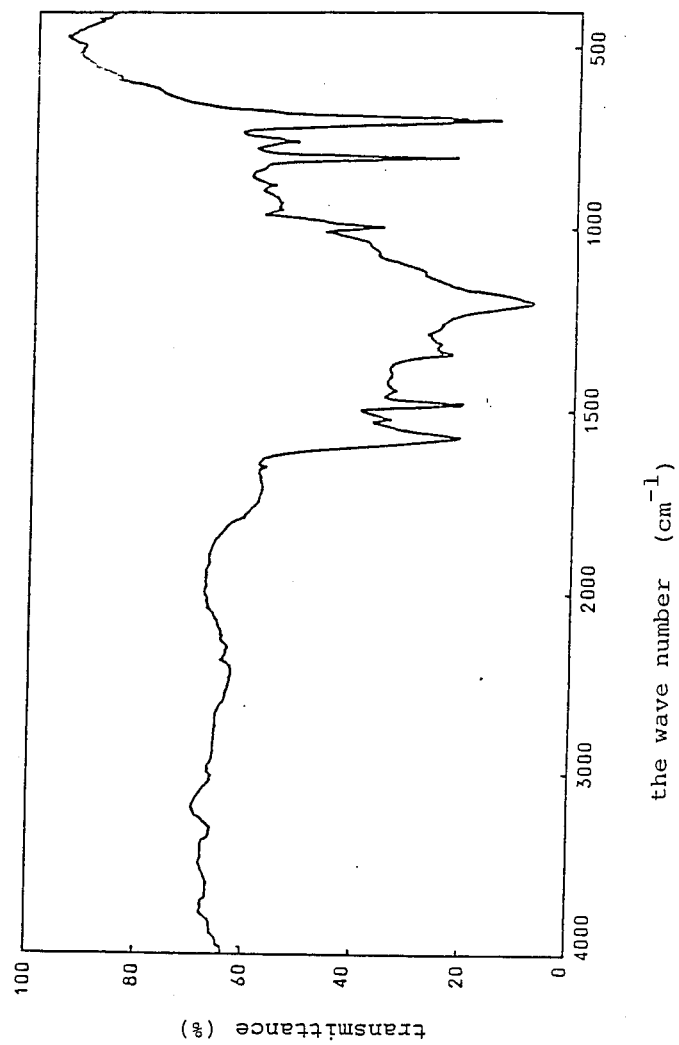
FIG. 1 is an IR absorption spectrum for the products obtained in Example 6.

Into a glass reactor, 50 ml of acetonitrile, 10 ml of benzene, 0.1 g of LiAsF$_6$, and 0.05 g of CuCl$_2$ were charged and stirred. A nesa glass (In-Sn oxide conductive glass) and a nickel plate each having a 2 cm$^2$ area were immersed in a solution and a constant voltage of 15 V was applied between both electrodes using the nesa glass as the anode and the nickel plate as the cathode (nickel plate). Dark red deposits were formed in a film-like manner on the side of the anode. After a reaction for 100 seconds, the anode was removed, washed with acetonitrile, and then dried at 60° C. The electroconductivity of the film was 10 S/cm at room temperature. As the result of an elementary analysis, it was confirmed that a film had a carbon/hydrogen ratio of 6/4. Further, as the result of an IR absorption spectrum measurement, peaks inherent to polyparaphenyl were observed at 1580, 1480, 1200, 1000, 810, 760, and 700 cm$^{-1}$.

EXAMPLE 2

Into a glass reactor, 50 ml of acetonitrile, 10 ml of benzene, 0.2 g of lithium borofluoride, and 0.05 g of cupric chloride were charged and stirred. A platinum plate and a nickel plate each having a 2 cm$^2$ area were immersed in a solution and a constant voltage of 8.0 V was applied between both of the electrodes while using a platinum plate as the anode and a nickel plate as the cathode. Black deposits were formed on the side of the anode. After a reaction for 40 minutes, the anode was taken out, washed with acetonitrile and dried at 60° C. followed by separation of the deposits from the electrode. As the result of an elemental analysis, it was confirmed that the product has a carbon/hydrogen ratio of 6/4, and it was identified as polyphenylene. The electroconductivity of the film was 1 S/cm at room temperature.

Also, in the case of using a solution conditioned by the same method while using benzonitrile as the solvent, deposition of a product having similar properties could also be confirmed but, in this case, a reaction time of 90 minutes was required.

EXAMPLE 3

To a glass reactor, 50 ml of acetonitrile, 1.2 g of diphenyl, 0.2 g of lithium borofluoride, and 0.05 g of cupric chloride were charged and anodized at a constant voltage of 6 to 20 V by the operations according to the method in Example 1. The current value per unit time was increased as the voltage was higher and the reaction was carried out for each of the cases up to the constant charge amount of 10 coulombs. In all cases, black products were obtained in a film-like manner. The electroconductivity of the product was 5–50 S/cm, which was not varied depending on the polymerizing voltage. Further, the open circuit voltage just after the completion of the reaction was 4.4–5.1 V.

Further, when the reaction time was reduced and the total amount of charge was controlled under the same conditions, a film of red to brown or purple hue was obtained. The color of the film turned green or brown when a reverse voltage at 1.8 V was applied to the reaction vessel. Further, the hue change in the films was also observed when immersing the films in an alkaline aqueous solution, such as an aqueous ammonia solution or an aqueous sodium hydroxide solution.

EXAMPLE 4

Into a reaction vessel, 50 ml of benzonitrile, 0.8 g of terphenyl, 0.2 g of lithium borofluoride, and 0.05 g of cupric chloride were charged and subjected to an electrolytic oxidizing reaction as in Example 1. Red or brown products were gradually deposited at an application voltage of 10 V and a film of less than 2 $\mu$m thickness was obtained after 180 minutes of reaction time.

EXAMPLE 5

Into a reaction vessel, 50 ml of acetonitrile, 1.5 g of naphthalene, 0.2 g of lithium borofluoride, and 0.05 g of cupric chloride were charged and subjected to an electrolytic oxidizing reaction as in Example 1. Production of film-like red deposits was recognized at an application voltage of 10 V.

EXAMPLE 6

Into a glass reactor vessel, 50 ml of nitrobenzene, 10 ml of benzene, 0.2 g of $LiAsF_6$, and 0.05 g of cuprous chloride were charged and stirred. A nesa glass and a nickel plate each having a 2 $cm^2$ area were immersed in the solution and a constant voltage at 30 V was applied between both of electrodes while using the nesa glass plate as the anode and the nickel plate as the cathode. Dark-green or red deposits were formed on the side of the anode. After 30 minutes' reaction, the anode was taken out, washed with benzene, and dried to obtain a film. The procedures as described above were carried out in an inert gas atmosphere.

As a result of an IR measurement for the thus obtained products, peaks inherent to polyparaphenylene were observed at 1580, 1480, 1200, 1000, 810, 760, and 700 $cm^{-1}$ as shown in FIG. 1. The electroconductivity of the film was 100 S/cm at room temperature.

EXAMPLE 7

Into a glass reactor, 50 ml of nitrobenzene, 4 ml of benzene, 0.2 g of $LiAsF_6$ and 0.1 g of algenic oxide were charged and stirred. A platinum plate and a nickel plate each having a 2 $cm^2$ area were immersed in a solution and a constant voltage at 20 V was applied between both electrodes using the platinum plate as the cathode and the nickel plate as the anode. Dark red deposits were formed in a film-like manner on the side of the anode. After a reaction for 30 minutes, the anode was taken out, washed with benzene, and then dried to obtain a film. The procedures were conducted in the inert gas atmosphere. As the result of an elementary analysis, it was confirmed that the film had a carbon/hydrogen ratio of 6/4 and that it was polyparaphenylene. The electroconductivity of the film was 10 S/cm at room temperature.

EXAMPLE 8

Into a reactor, 50 ml of benzonitrile, 0.8 g of diphenyl, 0.1 g of $LiBF_4$, and 0.1 g of algenic oxide were charged and stirred. A platinum plate and a nickel plate each having a 2 $cm^2$ area were immersed in a solution and a constant voltage at 20 V was applied between both electrodes while using the platinum plate as the anode and the nickel plate as the cathode. Black deposits were formed on the side of the anode. After a reaction for 30 minutes, the anode was taken out, washed with benzene, and dried to obtain a film. The procedure was conducted in an inert gas atmosphere. As the result of an elemental analysis, it was confirmed that the resultant product had a carbon/hydrogen ratio of 6/4 and was polyphenylene. The electroconductivity of the film was 1 S/cm at room temperature.

EXAMPLE 9

To a glass reactor, 50 ml of benzonitrile, 4 ml of benzene, 0.2 g of $LiBF_4$, and 0.1 g of AgO were charged and anodized at a constant voltage of 20 V by the operations according to the method in Example 7 Dark red products were deposited on the anode and after a reaction for 30, a film of less than 2 $\mu$m thickness was obtained.

The electroconductivity of the film was 10 S/cm after washing and drying.

Further, the hue of the films was directly changed from dark red to red brown in the case of immersing the film in a solution, such as an aqueous ammonia solution. As a result of a measurement for the electroconductivity of the red-brown film, it was $10^{-10}$ S/cm and confirmed to be a seniconductive high polymer.

EXAMPLE 10

Into a reaction vessel, 50 ml of benzonitrile, 0.8 g of terphenyl, 0.2 g of lithium borofluoride, and 0.05 g of cupric chloride was charged and subjected to an electrolytic oxidizing reaction as in Example 7. Red products were gradually deposited at an application voltage of 10 V and a film of less than 2 μm thickness was obtained after 180 minutes of reaction time.

EXAMPLE 11

Into a glass reactor, 50 ml of nitrobenzene, 4 ml of benzene, 0.2 g of LiASF$_6$, and 0.2 g of ferric chloride were charged and stirred. A platinum plate and a nickel plate each having a 2 cm$^2$ area were immersed in a solution and a constant voltage of 20 V was applied between both electrodes using the platinum plate as the anode and the nickel plate as the cathode. Dark red deposits were formed on the side of the anode. After a reaction for 30 minutes, the anode was taken out, washed with benzene, and then dried to obtain a film. The procedures were conducted in the inert gas atmosphere. As the result of an elementary analysis, it was confirmed that the resultant product had a carbon/hydrogen ratio of 6/4 and that it was polyphenylene. The electroconductivity of the film was 10 S/cm at room temperature.

EXAMPLE 12

Into a reactor, 50 ml of benzonitrile, 0.8 g of diphenyl, 0.1 g of LiBF$_4$, and 0.05 g of FeCl$_3$ were charged, and anodization was conducted at a constant voltage of 15 V by the procedures according to Example 11. Dark red deposits were formed gradually on the side of the anode and, after the reaction for 90 minutes, a film of 2 um thickness was obtained. The electroconductivity of film was 1 S/cm at the room temperature.

EXAMPLE 13

To a reactor, 50 ml of benzonitrile, 4 ml of benzene, 0.2 g of LiBF$_4$, and 0.1 g of FeCl$_3$ were charged and anodized at a constant voltage of 20 V by the operations according to the method in Example 11. Dark red products were deposited on the anode and, after a reaction for 30 minutes, a film of less than 2 μm thickness was obtained The electronconductivity of the film was 12 S/cm after washing and drying.

Further, the hue of the film directly changed from dark red to red brown when immersing the film in an aqueous ammonia solution. As a result of a measurement for the electroconductivity of the red-brown film, it was 10$^{-10}$ S/cm and confirmed to be a semiconductive high polymer.

EXAMPLE 14

Into a glass reactor, 50 ml of nitrobenzene, 4 ml of benzene, 0.2 g of LiAsF$_6$, and 0.1 g of MnCl$_3$ were charged and stirred. A platinum plate and a nickel plate each having 2 cm$^2$ area were immersed in a solution and a constant voltage at 20 V was applied between both electrodes using the platinum plate as the anode and the nickel plate as the cathode. Dark red deposits formed on the side of the anode. After a reaction for 30 minutes, the anode was taken out, washed with benzene, and then dried to obtain a film. The procedures were conducted in the inert gas atmosphere. As the result of an elementary analysis, it was confirmed that the resultant product had a carbon/hydrogen ratio of 6/4 and that it was polyphenylene. The electroconductivity of the film was 17 S/cm at room temperature.

EXAMPLE 15

Into a reactor, 50 ml of benzonitrile, 0.8 g of diphenyl, 0.2 g of LiBF$_4$, and 0.1 g of MnCl$_3$ were charged, and anodization was conducted at a constant voltage of 20 V by the procedures according to Example 14. Dark red deposits formed gradually on the side of the anode and, after a reaction for 30 minutes, a film of less than 2 μm thickness was obtained. The electroconductivity of the film was 11 S/cm at room temperature.

EXAMPLE 16

To a reactor, 50 ml of benzonitrile, 4 ml of benzene, 0.2 g of LiBF$_4$, and 0.1 g of MnCl$_3$ were charged and anodized at a constant voltage of 20 V by the procedures according to the method in Example 11. Dark red products were deposited on the anode and, after a reaction for 30 minutes, a film of less than 2 μm thickness was obtained.

The electroconductivity of the film was 12 S/cm after washing and drying.

Further, the hue of the film directly changed from dark red to red brown in the case of immersing the film in an aqueous ammonia solution. As a result of a measurement for the electroconductivity of the red-brown film, it was 10$^{-10}$ S/cm and confirmed to be a semiconductive high polymer.

EXAMPLE 17

Into a glass reactor, 50 ml of nitrobenzene, 4 ml of benzene, 0.2 g of LiAsF$_6$, and 0.1 g of RuCl$_3$ were charged and stirred. A platinum plate and a nickel plate each having a 2 cm$^2$ area were immersed in a solution and a constant voltage at 20 V was applied between both electrodes using the platinum plate as the anode and the nickel plate as the cathode. Dark red deposits formed on the side of the anode. After reaction for 30 minutes, the anode was taken out, washed with benzene, and then dried to obtain a film. The procedures were conducted in an inert gas atmosphere. As a result of an elementary analysis, it was confirmed that the resultant product has a carbon/hydrogen ratio of 6/4 and that it was polyphenylene. The electroconductivity of the film was 13 S/cm at room temperature.

EXAMPLE 18

Into a reactor, 50 ml of benzonitrile, 0.8 g of diphenyl, 0.1 g of LiBF$_4$, and 0.1 g of RuCl$_3$ were charged, and anodization was conducted at a constant voltage of 15 V by the procedures according to Example 17. Dark red deposits formed gradually on the side of the anode and, after a reaction for 90 minutes, a film of 2 μm thickness was obtained. The electroconductivity of the film was 13 S/cm at room temperature.

EXAMPLE 19

To a reactor, 50 ml of benzonitrile, 4 ml of benzene, 0.2 g of LiBF$_4$, and 0.1 g of ReCl$_3$ were charged and anodized at a constant voltage of 20 V by the procedures according to the method in Example 17. Dark red products gradually deposited on the anode and, after a reaction for 30 minutes, a film of 2 μm thickness was obtained. The electroconductivity of the film was 12 S/cm after washing and drying.

EXAMPLE 20

Into a reactor, 50 ml of nitrobenzene, 0.4 ml of benzene, 0.2 g of LiAsF$_6$, and 0.1 g of RuCl$_3$ were charged, and anodization was conducted at a constant voltage of 20 V by the procedures according to Example 17. Dark red deposits formed gradually on the side of the anode and, after a reaction for 30 minutes, a film of less than 2

μm thickness was obtained. The electroconductivity of film was 11 S/cm at the room temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing an electrically conductive polymer having an electroconductivity of from 10 to 100 S/cm, which comprises the steps of:

dissolving or dispersing a monomer selected from the group consisting of benzene, biphenyl, diphenylbenzene, dibiphenylyl, naphthalene, anthracene, and any derivative or substituted compound thereof and a compound which provides an electrolyte selected from the group consisting of iodine ion, chlorine ion, fluorine ion, $BF_4^-$, $ClO_4^-$, $AsF_6^-$, $SO_3^-$, and $PF_6^-$, in an organic polar medium;

applying a voltage of 5 to 80 V across the resulting solution or dispersion to effect an electrochemical, anodic oxidation reaction in the resulting solution or dispersion at a temperature lower than 80° C. in an inert gas, in the presence of at least one metal ion selected from the group consisting of a copper ion, a bivalent silver ion, a trivalent iron ion, a trivalent manganese ion, a ruthenium ion, a rhenium ion, and a rhodium ion, to obtain said electrically conductive polymer having an electroconductivity of from 10 to 100 S/cm; and separating said polymer.

2. The process as claimed in claim 1, wherein said metal ion is a copper ion.

3. The process as claimed in claim 1, wherein said metal ion is a bivalent silver ion.

4. The process as claimed in claim 1, wherein said metal ion is a trivalent iron ion or a trivalent manganese ion.

5. The process as claimed in claim 1, wherein said metal ion is an ion of ruthenium, rhenium or rhodium.

6. The process as claimed in claim 1, wherein said metal ion is contained in the reaction mixture in an amount of from 0.001 mole per liter to the saturation point.

7. The process as claimed in claim 1, wherein said monomer is contained in the reaction mixture in an amount of 0.1 to 10 moles per liter and said electrolyte is contained in the reaction mixture in an amount of 0.001 mole per liter to the saturation point.

8. The process of claim 1, wherein said organic polar medium is a solvent selected from the group consisting of acetonitrile, benzonitrile, nitrobenzene, nitromethane, dimethylformamide, hexamethyl phosphoamide, pyridine, propylene carbonate, tetrahydrofuran, dimethylsulfoxide, and dioxane.

9. The process of claim 1, wherein said compound which provides said electrolyte is selected from the group consisting of anionic alkali metal salts, alkaline earth metal salts, ammonium salts, and tetraalkyl ammonium salts of halogen elements.

10. The process of claim 9, wherein said compound which provides said electrolyte is selected from the group consisting of $LiAsF_6$, $LiClO_4$, $LiBF_4$, tetrabutyl ammonium $AsF_6$, tetrabutyl $ClO_4$, and tetrabutyl $BF_4$.

11. The process of claim 8, wherein said solvent is nitrobenzene, a bivalent silver ion is AgO, and a compound which produces the electrolyte is $LiAsF_6$.

12. The process of claim 8, wherein said solvent is nitrobenzene, a trivalent manganese ion is $MnCl_3$, and the compound which produces the electrolyte is $LiAsF_6$.

13. A film formed from the polymer produced according to claim 1.

14. The process of claim 1, wherein the voltage ranges from 15 to 40 V.

* * * * *